United States Patent [19]

Hara

[11] Patent Number: 4,797,542

[45] Date of Patent: Jan. 10, 1989

[54] MULTIPLE APPLICATION ELECTRONIC CARD-LIKE APPARATUS

[75] Inventor: Kazuya Hara, Tokyo, Japan

[73] Assignee: Casio Computer Co., Ltd., Tokyo, Japan

[21] Appl. No.: 7,343

[22] Filed: Jan. 27, 1987

[30] Foreign Application Priority Data

Feb. 4, 1986 [JP] Japan ................................. 61-22538

[51] Int. Cl.⁴ .............................................. G06K 5/00
[52] U.S. Cl. .................................... 235/380; 235/492
[58] Field of Search ........................ 235/380, 487, 492

[56] References Cited

U.S. PATENT DOCUMENTS

| | | | |
|---|---|---|---|
| 4,222,516 | 9/1980 | Badet et al. | 235/492 |
| 4,463,971 | 8/1984 | Hoppe et al. | 235/487 X |
| 4,539,472 | 9/1985 | Poetker et al. | 235/492 X |
| 4,558,427 | 12/1985 | Takeuchi et al. | 364/708 |
| 4,575,621 | 3/1986 | Dreifus | 235/380 |
| 4,697,073 | 9/1987 | Hara | 235/487 |
| 4,707,594 | 11/1987 | Roth | 235/492 X |

Primary Examiner—Patrick R. Salce
Assistant Examiner—Marc S. Hoff
Attorney, Agent, or Firm—Frishauf, Holtz, Goodman & Woodward

[57] ABSTRACT

A card-like electronic apparatus includes a plurality of external contacts and input terminals. The apparatus further includes a memory for storing application data, a designating unit for designating the application as stored in the memory, and a display unit for displaying the designated application data. When a power control key provided on the side of a card apparatus is in an on state, the application can be changed to another application by the designating unit. The applications as designated are successively displayed by the display unit. Through this display, the application to be used at any given time can be specified.

21 Claims, 10 Drawing Sheets

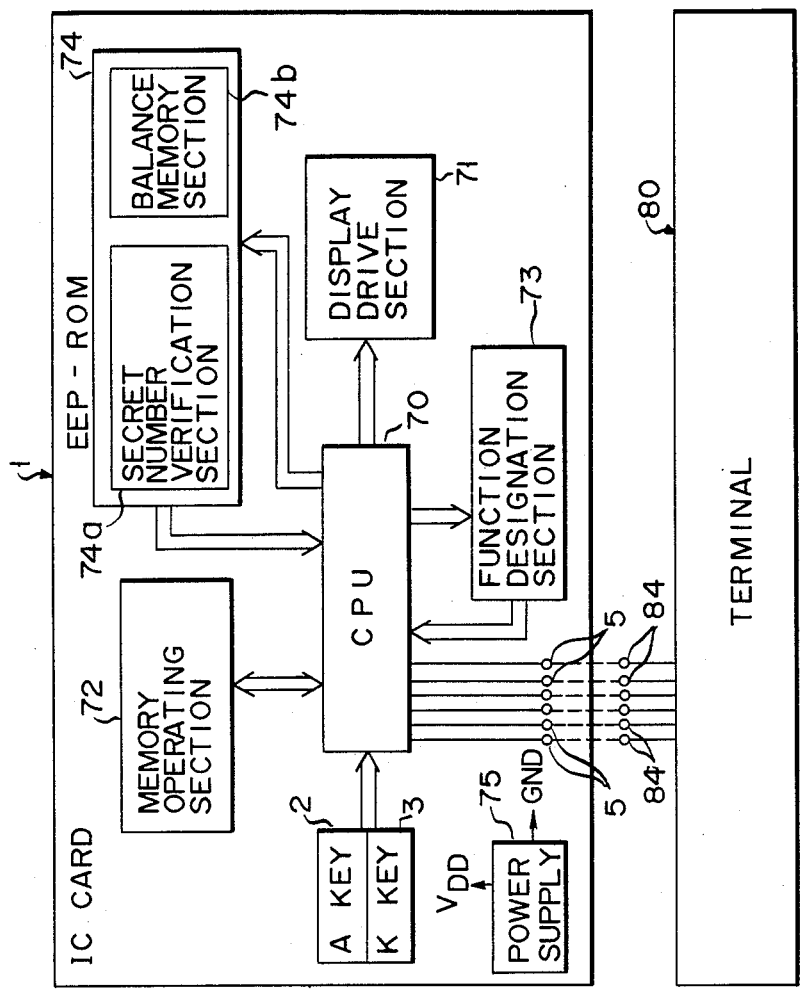
F I G. 12

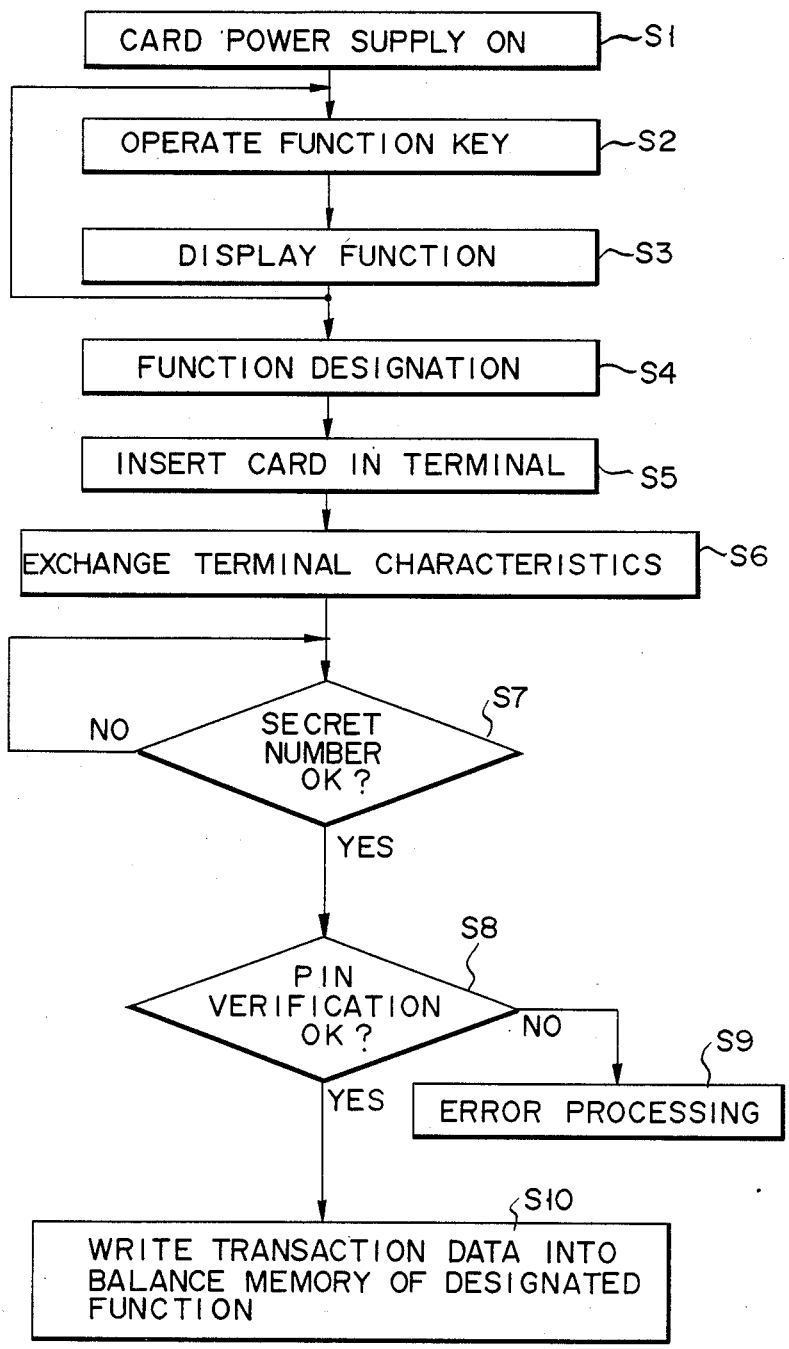

MULTIPLE APPLICATION ELECTRONIC CARD-LIKE APPARATUS

BACKGROUND OF THE INVENTION

This invention relates to an electronic card used for a plurality of applications, for example, credit, banking, and reservations including the purchasing of airline and train tickets, reserved seat tickets, hotel room reservations, etc.

Magnetic or embossed cards, for example, have been used for credit purchases. Also, there has been a trend toward the widespread use of IC cards with built-in IC chips storing personal identification numbers.

Magnetic cards and IC cards each, perform only a single function for credit purchases. When making credit purchases, a calculator for the totaling and checking of the credit purchases must be carried separately.

To cope with this, the applicant of the present application filed a patent application (Ser. No. 711,422) filed Mar. 13, 1985, which discloses a card-like electronic apparatus having both a calculation function and an identification function.

However, the card apparatus must be operable in multiple applications. Credit companies each employ a different terminal and a different method of processing for the credit card for each of the applications, such as credit buying, banking, airplane reservations, and hotel room reservations. Accordingly, a need arises for identifying the application from the terminal side. Many credit cards are needed for the respective applications. This results in inconvenience of carrying the cards, and checking to see if items have been lost or not. Since this card apparatus uses a solar cell as a power source, no on/off control switch is necessary, but the inconvenience arises in maintaining data in the memory and operation in dark places. When a dry battery cell is used in place of the solar cell, an on/off control switch must be used. In this case, in the card apparatus using an electronic device to check if that apparatus is compatible with the terminal used, when it is inserted into the terminal, the inconvenience occurs in which the transporting roller for the card apparatus, which is set in the terminal, makes the key contact, and the on and off states of the control switch before its insertion are changed.

SUMMARY OF THE INVENTION

Accordingly, an object of this invention is to provide a card-like electronic apparatus in which the card contains an application select function, and with the function, the terminal identifies the application.

Another object of this invention is to provide a card-like electronic apparatus in which a key state of the power control key remains unchanged even if the card apparatus is inserted into the terminal.

The card-like electronic apparatus according to this invention comprises a substrate which includes a plurality of external contacts and input terminal means. The card apparatus also comprises memory means for storing application data, application designation means for designating the application data stored in this memory means, and indication means for indicating the designated application data. The card-like electronic apparatus includes a power control key mounted on the side of the card apparatus. When one power control key is set to ON position, a desired application can be selected by the application designation means. The selected application is sequentially indicated by the indication means, to specify the application to be currently used.

BRIEF DESCRIPTION OF THE DRAWINGS

FIG. 12 shows a block diagram illustrating a circuit configuration of the card-like apparatus; and FIG. 13 shows a flowchart useful in explaining an operation of the card-like electronic apparatus.

DETAILED DESCRIPTION OF THE PREFERRED EMBODIMENTS

An embodiment of this invention will be given with reference to the accompanying drawings.

Figure 1:
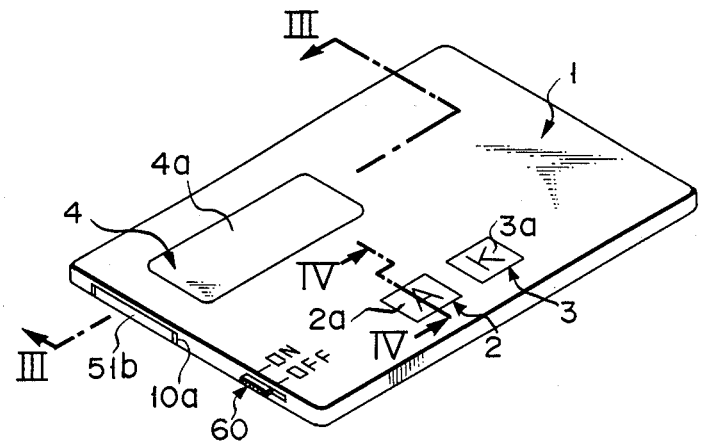
FIG. 1 shoows an overall perspective view of an intelligent card, or a card apparatus as viewed from the front or obverse side.
Figure 2:
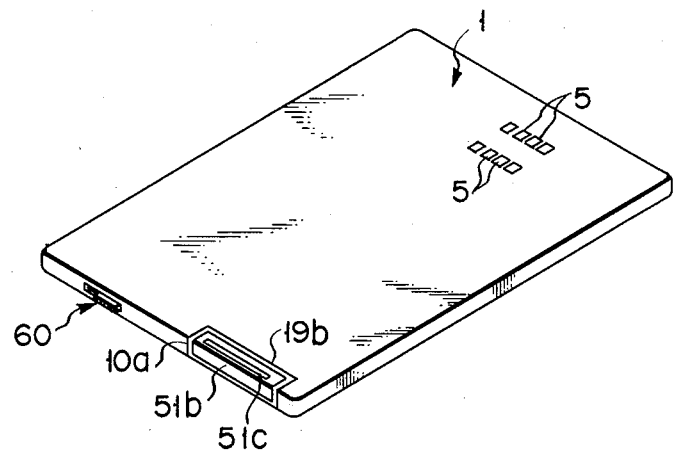
FIG. 2 shows an overall perspective view of the intelligent card as viewed from the rear.

FIGS. 1 and 2 show external views of a card-like electronic apparatus. The plane dimensions of this card-like electronic apparatus (hereinafter referred to as "card apparatus") are identical with those of the credit card prescribed by the ISO (85.5 mm×54 mm). This card apparatus, as shown in FIG. 1, includes application select key (hereinafter called "A key") 2, which is located in the center part of the lower portion on the obverse side of the card apparatus and selects the application of the card apparatus, history call-up key (hereinafter called "K key") 3 to call up the stored transaction history information and to display the information, and display section 4, which is located close to the upper and rear end portion of the card and displays the application selected by A key 2 and history information called up by K key 3. Also, a predetermined number of connection terminals 5, which are to contact with the card contact section on the bottom of the card insertion section of the card terminal to be described later, are arranged in two rows on the reverse side or lower surface of the card and closer to the front end of the card, as shown in FIG. 2.

Figure 3:
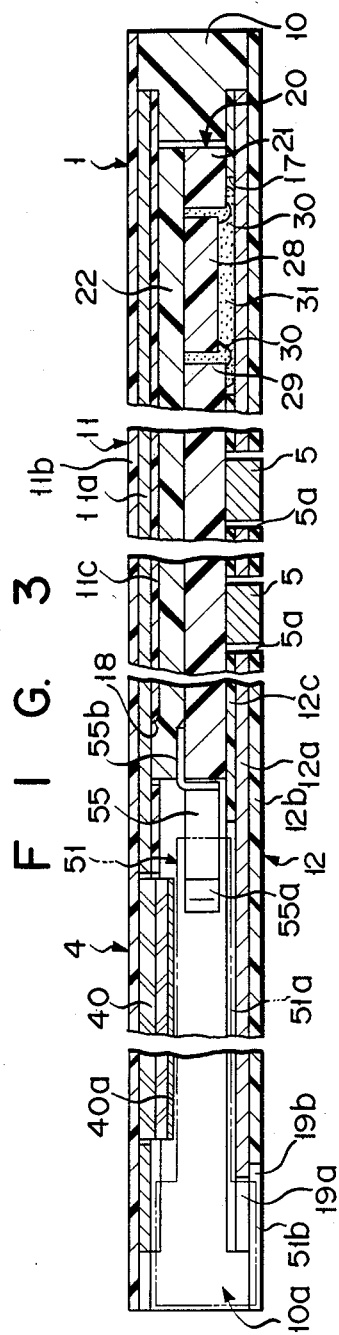
FIG. 3 shows an enlarged cross sectional view taken on line III—II in FIG. 1.
Figure 4:
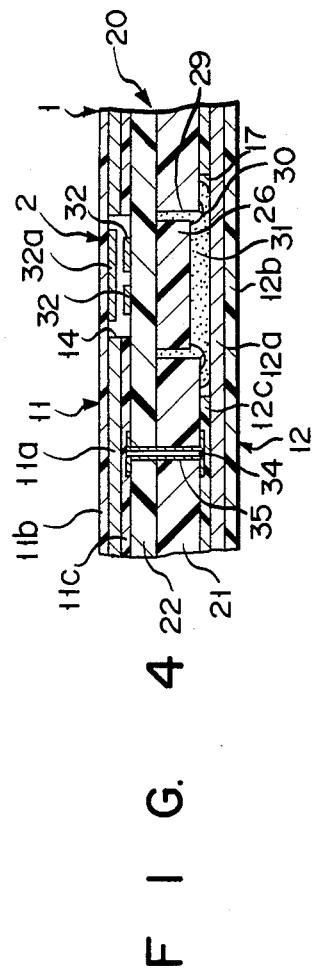
FIG. 4 shows an enlarged cross sectional view taken on line IV—IV in FIG. 1.
Figure 5:
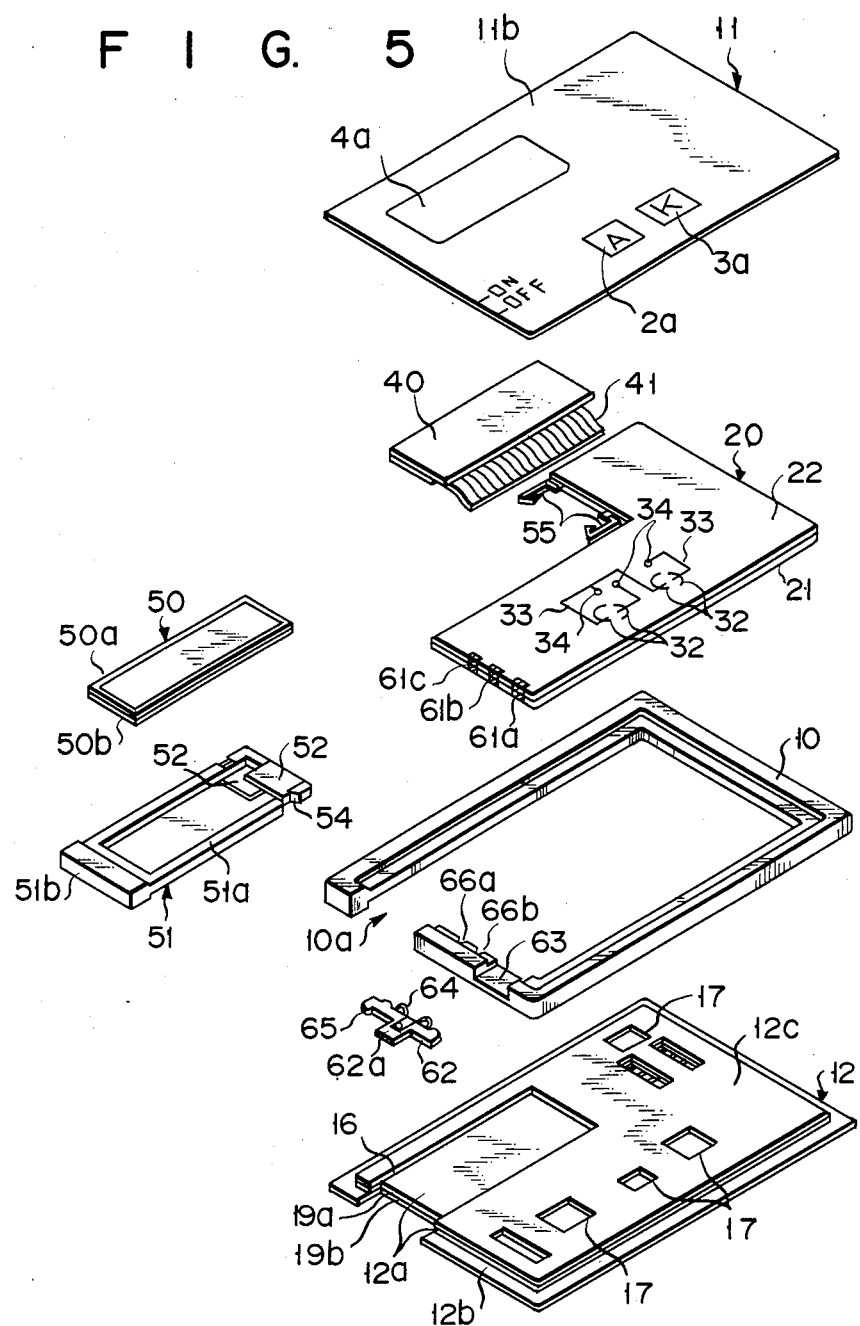
FIG. 5 shows an exploded view of the card apparatus in FIG. 1.

The construction of this card follows. FIGS. 3 and 4 show the cross sections taken along lines III—III and IV—IV of FIG. 1. FIG. 5 shows an exploded view of the card apparatus.

Wiring board unit 20, liquid crystal display panel 40, and paper-like battery 50, which is the power source for application selection and history data call-up, are provided inside card apparatus 1. Liquid crystal panel 40 is located closer to the upper and end sides of card apparatus 1. Paper-like battery 50 is located under liquid crystal display panel 40.

Figure 6:
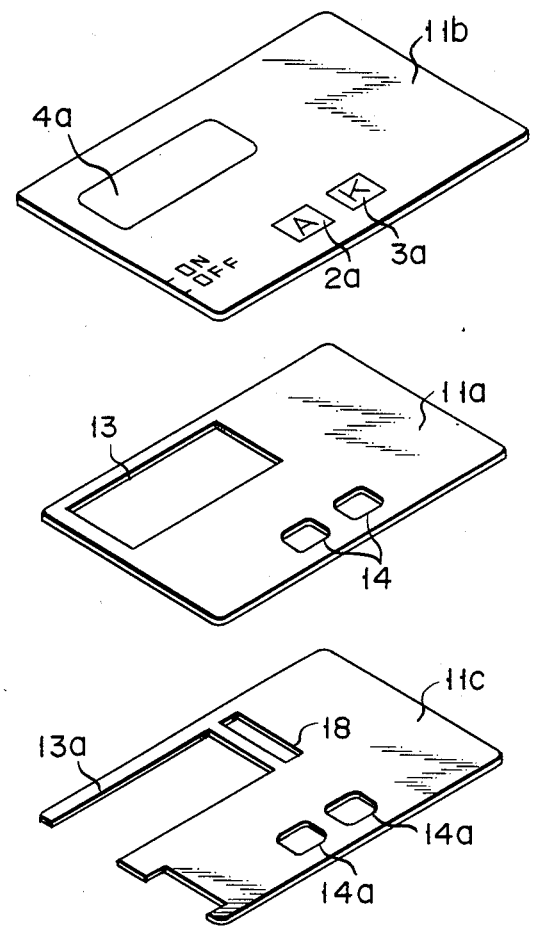
FIG. 6 shows an exploded view of an upper section panel of the card apparatus.

First, card apparatus 1 will be explained. Card apparatus 1 comprisess frame 10 made of synthetic resin to form the side surfaces of card apparatus 1, upper section panel 11, and lower section panel 12. Upper section panel 11, as shown in FIG. 6, is comprises of a two-layer lamination of upper section sheet 11a, which is slightly smaller than frame 10, and upper surface sheet 11b, which is the same size as the outer form of frame 10. Double sided adhesive sheet 11c is applied to the lower surface of upper section sheet 11. Upper surface sheet 11b is formed by applying the blind printing onto a sheet of transparent resin, such as polyester, with display window section 4a remaining left. Characters "A" and "K" for A key 2 and K key 3, which are designated by 2a and 3a, are printed on the center part of the lower portion of upper surface sheet 11b. Upper section sheet 11a is made of a metal panel such as stainless steel to ensure the strength of upper section panel 11. Upper section sheet 11a includes display panel insertion opening 13, which is formed facing to display window section 4a of upper surface sheet 11b, and key input seqtion openings 14 which are formed facing toward the key indication printed sections of upper surface sheet 11b. Double sided adhesive sheet 11c is the same size as upper surface sheet 11b. It is provided with cut-out section 13a which is formed corresponding to display panel insertion opening 13 of upper section sheet 11a, and openings 14a which is formed corresponding to key input section openings 14.

Figure 7:
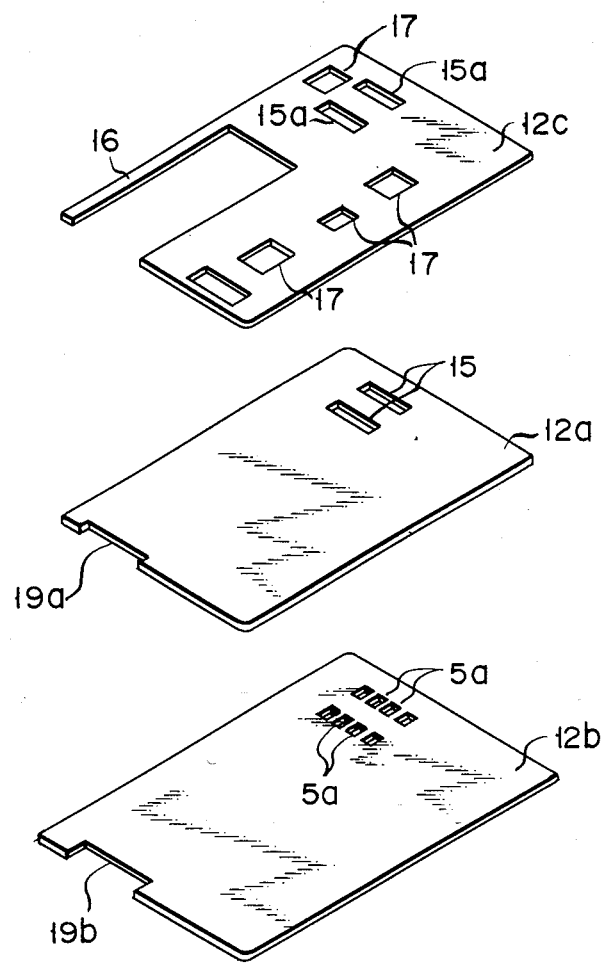
FIG. 7 shows an exploded view of a lower section panel of the card apparatus.

Lower section panel 12, as shown in FIG. 7, includes a two-layer structure formed by laminating together the lower surface of lower section sheet 12a, which is slightly smaller than the outer form of frame 10, and lower surface sheet 12b, which is the same size as the outer form of frame 10. Double sided adhesive sheet 12c is applied to the upper surface of lower section sheet 12a. Lower surface sheet 12b may be a sheet of resin such as polyester. Lower surface sheet 12b is provided with openings 5a to expose connection terminals 5 on the lower surface of wiring board 20 to the lower surface of the card. Lower section sheet 12a may be a metal sheet made of, for example, stainless steel, to ensure the strength of lower section panel 12. Lower section sheet 12a is provided with terminal insertion openings 15, which serve as take-off openings for connection terminals 5. Double sided adhesive sheet 12c is of the same size as lower section sheet 12a. Double sided adhesive sheet 12c is provided with cut-out section 16, which provides access to battery holder 51. Battery holder 51 is inserted into the lower side of liquid crystal display panel 40 and holds paper-like battery 50. Openings 15a, which correspond to terminal insertion openings 15 of lower section sheet 12a, are also provided in double sided adhesive sheet 12c.

Also, frame 10 is cut out, with the stepped top and bottom portions of the periphery left intact, and a cut-out, corresponding to the inserting section of paper-like battery 50, is made to form battery inserting section 10a. Upper and lower section panels 11 and 12 are secured to the surface of the depressed portion of frame 10 by adhesive, adhered to the peripheral portion of the upper and lower sections 11b and 12b.

Figure 8:
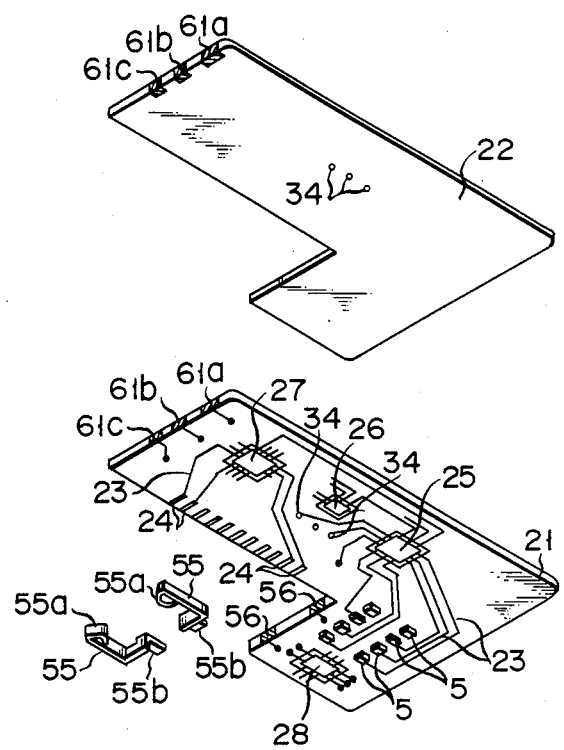
FIG. 8 shows an exploded view of a circuit board unit of the card apparatus.

Wiring board unit 20, which is provided in card apparatus 1, will be explained. As shown in FIG. 8, wiring board unit 20 comprised of main wiring board 21 and sub-wiring board 22, which is laminated to main wiring board 21. Main wiring board 21 and sub-wiring board 22 are made into the same shape, with the cut-out portion accommodating liquid crystal display panel 40 and paper-like battery 50 located under said panel 40. Main wiring board 21 has wiring 23 formed in a predetermined pattern on the lower surface. The required number of connection terminals 5 are mounted on the lower surface of main wiring board 21 so as to correspond with openings 5a in lower surface sheet 12b. Also, a number of display panel connection terminals 24 are arranged in the end portion of main wiring board 21 that faces the mounted portion of the display panel. Connection terminals 5 are inserted through openings 5a of lower surface sheet 12b, and are exposed to the lower surface of the card, as shown in FIG. 3. These connection terminals 5 are formed to have approximately the same thickness as lower section panel 12 so that their outside surfaces will be almost flush with the lower surface of the card.

Four IC (Integrated Circuit) chips, CPU (Central Processing Unit) chip 25, expansion I/O (Input/Output) port chip 26, display drive chip 27, and EEPROM (Electrically Erasable Programmable Read-Only Memory) chip 28, and components such as chip capacitors (not shown) are mounted on main wiring board 21 as shown in the drawing. These IC chips 25 to 28 are inserted into opening 29 of main wiring board 21, with their thickness within that of main wiring board 21, as shown in FIGS. 3 and 4. These IC chips 25, 26, 27 and 28 are mounted to wirings 23 of main wiring board 21 by wire bonding. In FIGS. 3 and 4, reference numeral 30 designates the bonding wire, and numeral 31 the sealing resin used to seal the mounting surfaces of the IC chips. This sealing resin 31 is used to polymerize main wiring board 21 with IC chips 25, 26, 27 and 28 mounted on it to sub-wiring board 22. Sealing resin 31 is applied to the mounting surfaces of the IC chips, which are then fixed to the surface of sub-wiring board 22.

Two pairs of key contacts 32 (see FIG. 5) are formed onto the upper surface of sub-wiring board 22 so that they will face the key display printing section of upper surface sheet 11b. wirings 33 are made to extend outward from key contacts 32. Wiring leads 33 are routed via through holes 34 of sub-wiring board 22 and main wiring board 21, and connected to wirings 23 of main wiring board 21, respectively. These through holes 34 are made after main wiring panel 21 and sub-wiring panel 22 are laminated together. Since the walls of through holes 34 are plated, wiring 33 of sub-wiring board 22 and wiring 23 of main wiring board 21 are connected through plating layer 35 (see FIG. 4).

Liquid crystal display panel 40 is connected through flexible connector 41 (see FIG. 5) to the display panel connection terminal arrangement section of main wiring board 21. The main wiring board connection terminals of flexible connector 41 are covered by sub-wiring board 22.

Wiring board unit 20 and liquid crystal display panel 40 which is connected to main wiring board 21 are installed inside the frame 10 of card apparatus 1, as shown in FIG. 3. The upper and lower surfaces of wiring board unit 20, in other words, the upper surface of sub-wiring board 22 and the lower surface of main wiring board 21, are fixed to upper section panel 11 and lower section panel 12 with double sided adhesive sheets 11c and 12c. Also, the upper surface of liquid crystal display panel 40 is faced toward display window section 4a of upper surface sheet 11b and adhered with transparent adhesive. Openings 17 as shown in FIG. 7, are provided in double sided adhesive sheet 12c on the lower section panel 12 to provide an escape for sealing resin 31 for sealing the IC chip that protrudes from the lower surface of main wiring board 21. These openings are disposed corresponding to the IC chip mounting portions of main wiring board 21. Connection terminals 5 on the lower surface of main wiring board 21, are inserted into openings 5a in lower section panel 12. The protruding section of IC chip sealing resin 31 is made to fall within the thickness of double sided adhesive sheet 12C, as shown in FIGS. 3 and 4. Lower section panel 12 is adhered to main wiring board 21.

In FIG. 4, 32a designates a movable key contact facing each of key contacts 32 on the upper surface of sub-wiring board 22. Movable key contact 32a is printed with, for instance, carbon ink on the lower surface of the key display printing section of upper surface sheet 11b. Movable key contact 32a makes contact with key contacts 32 by means of pushing the key display printing section of upper surface sheet 11b down. Movable key contact 32a and key contacts 32 make up the application select key input section and history call-up section.

Next, paper-like (or sheet-like) battery 50, which is used as the power source battery for application selection and history call-up, will be explained. In this embodiment, paper-like (or sheet-like) battery 50 comprises two paper-like battery cells 50a and 50b laminated together to form a two-layer battery as shown in FIG. 5. The electricity generation principle of each of the paper-like battery cells 50a and 50b are the same as that of the lithium battery. The upper and lower cells each contain an electricity generating unit between its electrode plates and are each 0.5 mm in thickness. In this embodiment, a single common plate serves as the lower plate of upper paper-like battery cell 50a and the upper plate of lower paper-like battery cell 50b. With this common plate, the total thickness of paper-like (or sheet-like) battery 50 is only 0.9 mm.

Figure 9:
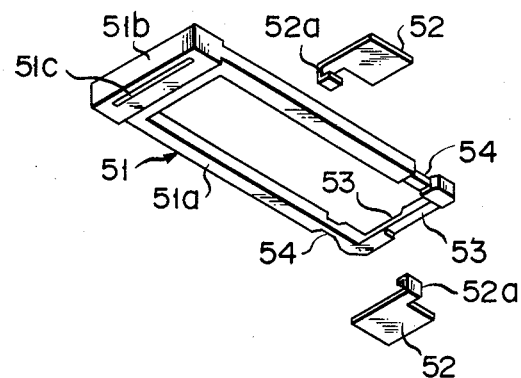
FIG. 9 shows an exploded view of a battery holder.

Paper-like (or sheet-like) 50 is installed in battery holder 51. Battery holder 51 into battery inserted into a lower portion of the battery inserting section 10a of frame 10. In the upper portion of the battery inserting section 10a, liquid crystal panel 40 is disposed. Battery holder 51 is constructed in the following manner. Battery holder 51 is shown in FIG. 9, and is made of synthetic resin. It includes battery holder section 51a for tightly receiving paper-like battery 50, and thumb knob 51b, which is formed onto the end of battery holder section 51a. Battery holder section 51a is in a frame-like shape, with the top and bottom surfaces open. It is slightly (about 1 mm) thicker than paper-like battery 50. Thumb knob 51b is yet slightly thicker than battery holder section 51a. Numerals 52 designate a pair of battery contact plates made of sheet metal which are provided on the upper and lower surfaces of the front end of battery holder section 51a. These battery contact plates 52 are fitted into convex sections 53 of the upper and lower surfaces of the front end of battery holder section 51a. U-shaped portions 52a which are located on one side of battery contact plates 52, are inserted into cut-out sections 54 formed in both sides of the front end of battery holder section 51a. This completes the installation of battery contact plates boards 52 onto battery holder section 51a. Battery holder 51 holds paper-like battery 50, which is installed in battery holder section 51a between battery contact plates 52. The upper battery contact plate 52 contacts the upper surface of upper battery cell 50a (the negative surface), and the lower battery contact plate 52 contacts the bottom surface of lower battery cell 50b (the positive surface). In this way, paper-like battery 50 is sandwiched between the two battery contact plates.

Battery holder 51 is inserted from battery inserting section 10a into the battery holder receiving space (the space within the cut-out section of wiring board unit 20) beneath liquid crystal display panel 40 of card apparatus 1. Battery holder 51, as indicated by the two-dot-chain line in FIG. 3, is inserted into the battery holder receiving space, the upper and lower surface being guided by the lower surface of liquid crystal display panel 40 (the surface of the reflector plate 40a on the lower surface of the display panel) and the upper surface of lower section sheet 12a of lower section panel 12. Also, battery holder 51 is inserted so that thumb knob 51b is fully inserted into the inside of card apparatus 1, and the outer surface of thubb knob 51b is flush with the outer surface of card apparatus 1. The upper surface of thumb knob 51b is inserted below upper section sheet 11a of upper section panel 11, and the lower surface of thumb knob 51b is inserted into cut-out sections 19a and 19b in the edge portion of lower section sheet 12a of lower section panel 12 and lower surface, sheet 12b (FIG. 7). The lower surface of thumb knob 51b is almost even with the lower surface of card apparatus 1.

U-shaped portions 52a of battery contact plates 52 of battery holder 51 are used as the electrode sections contacting with terminal plates 55 for battery connection mounted on wiring board 21 of main wiring board 20. Terminal plates 55 are made of leaf spring material, and shaped as shown in FIG. 8. Inverted "V" section 55a, contacts U-shaped portion 52a of battery contact plate 52, as inserted from the side into cut-out portion 54 in the front end of battery holder 51 (the front end of battery holder section 51a) which is formed in the front end of terminal plate 55. In one end of plate 55, mounting section 55b is formed by bending the other end of terminal plate 55 in a horizontal direction. These terminal plates 55 are located so that they face each other with a distance corresponding to the width of battery holder 51. Mounting sections 55b are soldered to terminal electrodes 56, which are formed on the side surface of main wiring board 21 by turning it from the side of wiring board 21 upwardly, and mounted to main wire board 21. Board mounting sections 55b which were soldered onto terminal electrodes 56 are covered by sub-wiring board 22 (FIG. 3). The curved part of sub-wiring board 22 laid on board mounting section 55b is inserted into opening 18 (FIG. 6) in double sided adhesive sheet 11c of upper section panel 11, as shown in FIG. 3.

Terminal plates 55 lock battery holder 51 inserted into card apparatus 1, and also make contact with battery contact plates 52 of battery holder 51 to connect paper-like battery 50 to main wiring board 21. While battery holder 51 is inserting into card apparatus 1, inverted "V" sections 55a of terminal plates 55 are deformed outwardly by side surfaces of battery holder 51. When battery holder 51 is completely inserted into card apparatus 1, inverted "V" sections 55a of battery connection terminal plates 55 extend into cut-out portions 54 of battery holder 51 by the spring force of terminal plates 55, and lock it into place with their spring power. Inverted "V" sections 55a and 55a make contact with U-shaped portions 52a battery contact plate 52 and electrically connect paper-like battery 50, held in battery holder 51, with main wiring board 21. A fingernail slot 51c is provided in the lower surface of thumb knob 51b of battery holder 51, as shown in FIG. 9. When the battery is to be replaced, the battery holder can be removed by hooking a fingernail into fingernail slot 51c and pulling strongly.

Figure 10:
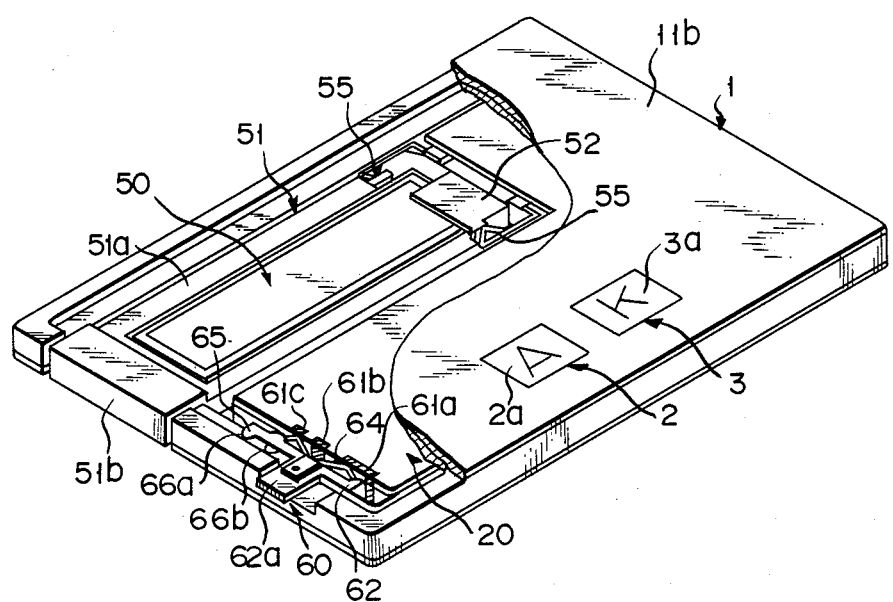
FIG. 10 shows a partially broken perspective view of the card apparatus in FIG. 1.

In FIGS. 1 and 2, reference numeral 60 designates a power switch mounted on the side surface of the rear end of card apparatus 1, as placed by the side of battery inserting section 10a. Power switch 60 has a construction as given below. In FIGS. 5 and 10, reference numerals 61a, 61b and 61c designate contacts for the slide switch, which are formed on the side surface of wiring board unit 20. Of these contacts, contacts 61a and 61b are GND contacts, and contact 61c is a VDD contact. Each of the contacts of wiring board 21 and 22 has bent portion at the corner of the board. Each of said bent portions faces that of the other board when these boards are coupled with each other in assemblage. Namely when boards 21 and 22 are coupled, the contacts 61a to 61c of one board are correspondingly in contact with those of the other board. In FIGS. 5 and 10, reference numeral 62 designates a sliding member made from resin which is slid in the diretion along the width of card apparatus 1, while being guided by the inner side of frame 10 of card apparatus 1. Sliding member 62 is provided with operation knob 62a which protrudes slightly outside card apparatus 1, from concave portion 63 of frame 10. On the side of sliding member 62 that faces wiring board unit 20, is provided a brush 64 made of leaf spring both ends of which resiliently contact the side of wiring board unit 20. Brush 64 slides together with sliding member 62 to selectively connect one of contact 61a, 61b and 61c formed on the side of wiring board unit 20. If sliding member 62 is slid toward display section 4 by sliding operation knob 62a, brush 64 comes in contact with GND contact 61a and VDD contact 61c, as shown in FIG. 10, so that power switch 60 is turned on. If sliding member 62 is slid in the opposite direction to such a position as to allow brush 64 to contact GND contact 61b, brush 64 departs from VDD contact 61c, and then the power switch is turned off. Frame 10 has two concave portions 66a and 66b which fit into convex portion 65 formed at one end of sliding member 62. These concave portions provides snapping motion of sliding member 62. They also lock sliding member 62 at ON and OFF positions.

Wiring board unit 20 has such a thickness as to be fit into the space between upper section panel 11 and lower section panel 12. Therefore, the thickness of the electronic card apparatus is equal to the sum of the thickness of about 1 mm of battery holder 51, that of about 0.5 mm of liquid display panel 40, the thickness of upper surface sheet 11b of upper section panel 11, and that of lower surface sheet 12b of lower section panel 12. That is to say, this card apparatus has a thickness of about 1.8 mm. This card apparatus is slightly thicker than a card apparatus with a single application not having the display section and the input section. However, this apparatus can be smoothly inserted into the card terminal.

Figure 11:
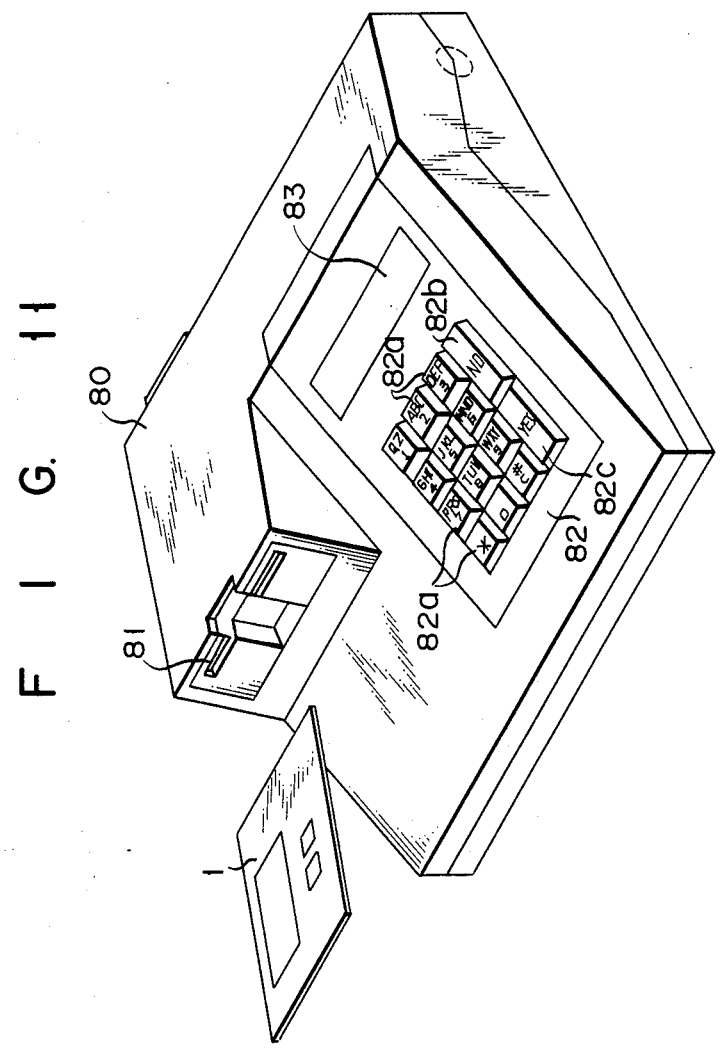
FIG. 11 shows a perspective view of a terminal into which the card-like electronic apparatus is inserted.

FIG. 11 shows an external view of card terminal 80 with card apparatus 1 as inserted in it. Card terminal 80 comprises card insertion slot 81 for inserting card apparatus 1, keyboard section 82, and display section 83. Keyboard section 82 includes ten keys 82a, YES key 82b and NO key 82c. These keys are for entering personal identification number and transaction data. Probes 84 (FIG. 12) which are in contact with connecting terminals 5 of card apparatus 1, are provided inside card terminal 80. The top ends of probes 84 after probes 84 face card insertion slot 81. Probes 84 84 are connected to connecting terminals 5 and 5 of card apparatus 1 as inserted into card insertion slot 81 by an elevating mechanism. Card terminal 80 includes a transporting mechanism (not shown) such as a roller, for transporting card apparatus 1 to such a position where probes 84 and 84 face connecting terminals 5 and 5 of card apparatus 1. Card terminal 80 further contains an internal circuitry including a working RAM (Random Access Memory), a terminal attribute ROM, system program ROM and control section and the like. These circuits are necessary for performing transaction with card apparatus 1. The working RAM stores the application data as selected in card apparatus 1 and the attributes of card apparatus 1. The terminal attribute ROM stores its attributes. System program ROM stores an ENQ code and a TC code. These will be described later.

The circuit configuration of card apparatus will now be described. In FIG. 12, reference numeral 70 designates CPU. CPU 70 is connected to connecting terminals 5 which are connected to the card contact section of the card terminal, and is also connected to application select key 2, personal history call-up key 3 and display drive section 71. CPU 70 is further connected to memory operating section 72, application designation section 73 and EEPROM 74. EEPROM 74 comprises personal identification number verification section 74a and balance memory section 74b. This section 74a stores personal identification numbers (hereinafter called "PIN"), and compares PIN with the input information, i.e., the personal identification number input by the card owner, as input from the keyboard connected to card terminal 80, to issue a coincident or noncoincident signal. Balance memory section 74b stores history data such as the card use history, that is, transaction data by the use of the card. Application designation section 73 stores application data such as credit, banking and reservation. Reference numeral 75 designates a battery cell.

The operation of card apparatus 1 will now be described with reference to the flowchart of FIG. 13.

First, in step S1, power switch 60 of card apparatus 1 is operated to turn on the power. With this power on, the entire circuit is initialized.

Control advances to steps S2 and S3. In steps S2 and S3, application select key 2 shown in FIG. 2 is operated to designate an application. When application select key 2 is depressed, the key input signal is supplied to CPU 70. Then, first application data is read out from application designation section 73 and stored in memory operating section 72. At the same time, the data is displayed in display section 4 via display drive section 71.

When the displayed item in the display section 4 is not a desired one, application select key 2 is depressed again. Then, through the same route as that described above, the key input signal is supplied to CPU 70, and the next application data is read out from application section 73, and the previous data stored in memory operating section 72 is updated to the present one. At the same time, this data is displayed in display section 4. Steps S2 and S3 are repeated in the same manner as above.

When, through these steps, the application displayed in display section 4 is the desired one, the designating operation for the application is ended in step S4. The applications are stored in the predetermined working areas in memory operating section 72, in terms of binary codes, for example, "00000001" for home shopping, "00000010" for home banking, and "00000011" for home reservation.

Control advances to step S5. In this step, a user inserts card apparatus 1 into terminal 80. As recalled, card apparatus 1 is provided with application select key 2 and display section 4 on its obverse side, and connecting terminals 5 on itsrreverse side. With this structural feature, after card apparatus 1 is set with the obverse side facing up, application select key 2 is operated, and the selected application item is checked on the display screen, there is no need for the additional operation to reverse card apparatus 1 for facing its reverse side facing up. In terminal 80, the internal mechanism causes probes (not shown), which are to be in contact with connection terminals 5 of card apparatus 1, to face up. Therefore, the application select key 2, display section 4, and connection terminals 5 are arranged so as to be convenient to users.

Card apparatus 1 is transported to a predetermined position by transporting roller (not shown) provided in terminal 80. As recalled, card apparatus 1 is provided with power switch 60 on its side. Accordingly, there never occurs such a situation that, when card apparatus 1 is inserted into terminal 80, the transporting means such as the transporting roller, which is provided in terminal 80, pushes power switch 60 to turn off the power source. Therefore, card apparatus 1 can reliably keep the application data.

When card apparatus 1 is set to and at the predetermined position in terminal 80, and connecting terminals 5 of card apparatus 1 and the probes (not shown) of terminal 80 are connected to each other, the attributes of card apparatus 1 are interchanged with those of terminal 80 in step S6. Specifically, first, an initializing signal is transferred from terminal 80 to card apparatus 1. This initializing signal is processed as an interrupt signal in card apparatus 1. All the data in CPU 70 are cleared except data such as the selected application data stored in memory operating section 72. Then, answer-to-reset data is transferred from card apparatus 1 to terminal 80. When the data is determined to be correct in terminal 80, an ENQ code is transferred from terminal 80 to card apparatus 1. This code is written into memory operating section 72 in card apparatus 1. CPU 70 in card apparatus 1 checks whether or not the ENQ code is received in a normal operation mode. If the answer is YES, CPU 70 transfers an ACK code to terminal 80. If NO, an NAC code is transferred. If terminal 80 confirms that CPU 70 in card apparatus 1 is operating normally, a TC code is transferred from terminal 80 to card apparatus 1. Then, the application data stored in memory operating section 72 in card apparatus 1 is read out and stored in terminal 80. When, as described above, the attributes of card apparatus 1 and terminal 80 are interchanged with each other, card apparatus 1 is ready for PIN enter, as in step S6. Normally, in this state, a message such as "Enter PIN" is displayed in display section 83 of terminal 80. The user then inputs a personal identification number using ten keys 82a of terminal 80.

When the personal identification number is input, control advances to step S8, where the PIN is verified in card apparatus 1. The personal identification number as input from terminal 80 is transferred to personal identification number verification section 74a in EEP-ROM 74. The number is compared with the PIN as previously stored in personal identification number verification section 74a. If the two coincide, a coincident signal is transferred from apparatus 1 to terminal 80. If not, an noncoincident signal is transferred. Then, "OK" or "NG" is displayed in display section 83 in terminal 80.

In the case of "NG", as shown in step S9, an error processing, such as the ejection of card apparatus 1, is executed.

If the transaction is OK, the salesclerk inputs transaction data to terminal 80, such as the price of the merchandise that the customer (card owner) buys on credit, from its keyboard section 82. The transaction data as input to terminal 80 is transferred from terminal 80 to card apparatus 1. Then, in step S10, the transaction data is written in. The transaction data is transferred to balance memory section 74b in EEP-ROM 74, and stored in the credit memory area. The same operation is performed when card apparatus 1 is used for banking, reservation and the like. For example, when the application of the card is selected for banking, and the card is used as a banking card, the data transferred from terminal 80, i.e. the bank account deposit or withdrawal data, is stored in the banking memory area in balance memory section 74b. When the application of the card is selected for reservation, and the card is used as a reservation card, the data transferred from terminal 80, i.e. reservation data, money amount data and the like, are stored in the reservation memory area in balance memory section 74b.

Card apparatus 1 which has stored the transaction data and the like is extracted from the terminal, after the operation of the terminal is ended.

Card apparatus 1 has a function to display in display section 4, history data such as transaction data stored in balance memory section 74b. Specifically, power switch 60 is turned on, and application select key 2 is operated, to select the application of the card, for example, credit. Under this condition, if history call-up key 3 is operated, data stored in credit memory area are sequentially read out from balance memory section 74b in the order of data storage, and sequentially displayed in display section 4. When the application of the card is selected for banking, if history call-up key 3 is operated, the data stored in the banking memory area in balance memory 74b is sequentially displayed in display section 4. When the application of the card is selected for reservation, if history call-up key 3 is operated, the data stored in the reservation memory area in balance memory section 74b is sequentially displayed in display section 4. Accordingly, even if the user has forgotten the amount of money used for credit buying, the balance of the bank account, or the details of the reservation, desired history data stored in this card can be called up, to know the history of the use of the card for each application. The display of history, data may be automatically changed at fixed time intervals (e.g. 1 to 2 second). Alternately, it may be changed every time history call-up key 3 is operated.

What is claimed is:

1. A multiple application card-like electronic apparatus, comprising:
   electronic component means for performing predetermined electrical functions, including:
   circuit board means having a plurality of external terminals for connecting to an external device,
   input terminal means for receiving an input signal,
   memory means for storing application data, application designation means for selecting application data stored in said memory means according to an input signal received through said input terminal means, and indication means for indicating application selected by said application designation means; and cover means for covering said electronic component means, said cover means having an outer surface defining a substantially flat plane and an opening in said outer surface for exposing said external terminals to the outside of said card-like electronic apparatus.

2. An apparatus according to claim 1, wherein said cover means includes an upper cover means for covering one side of said electronic component means and a lower cover means for covering another side of said electronic component means.

3. An apparatus according to claim 2, wherein:
said external terminals are formed on the side where said circuit board means faces said upper cover means,
said input contact means is formed on the side where said circuit board means faces said lower cover means,
said upper cover means has a display window section, and
said indication means faces said display window section of said upper cover means.

4. An apparatus according to claim 2, wherein said upper cover means includes a plurality of sheet members.

5. An apparatus according to claim 2, wherein said lower cover means includes a plurality of sheet members.

6. An apparatus according to claim 2, wherein said circuit board means includes a plurality of insulating sheet members which are polymerized.

7. An apparatus according to claim 6, wherein:
said electronic component means includes a plurality of semiconductor integrated circuit chips,
each of said insulating sheet members includes an opening for accommodating said circuit chips, and
each of said circuit chips is supported at the bottom thereof by another insulating substrate while being accommodated in said respective opening.

8. A multiple application card-like electronic apparatus, comprising:
electronic module means for performing predeterined electrical functions, including:
a side surface having a predetermined length, and a width much smaller than said predetermined length,
input means for detecting an input signal
indication means for indicating information according to said input means,
memory means for storing identification data, and
power battery means for supplying a drive voltage to said electronic module means; and
a power control switch means, provided on said side surface of said electronic module means, for externally controlling the supply of said drive voltage from said power battery means to said input means and to said indication means.

9. An apparatus according to claim 8, wherein said electronic module means further includes a circuit board having a predetermined wiring pattern, and a cover means for covering said circuit board.

10. An apparatus according to claim 9, wherein said circuit board includes an integrated circuit chip including said memory means.

11. An apparatus according to claim 9, wherein said cover means has an opening therein, and said power control switch means comprises a slide switch slidably accommodated in said opening of said cover means.

12. An apparatus according to claim 11, wherein said slide switch includes a slidable member having contact means for making an electrical contact, and wherein said circuit board includes a fixed contact means for contacting with said contact means of said slidable member.

13. An apparatus according to claim 12, wherein said circuit board includes a side surface whose width is smaller than said width of said side surface of said electronic module means, and said fixed contact means is formed on said side surface of said circuit board.

14. A multiple application card-like electronic apparatus, comprising:
electronic component means for performing predeterined electrical functions including:
circuit board means for carrying a circuit, and having a predetermined wiring pattern,
a semiconductor integrated circuit chip connected to said wiring pattern,
a plurality of external terminals for connect to an external device, and
key input contacts connected to said integrated circuit chip;
cover means for covering said electronic component and having a narrow side surface with an opening;
power source means for supplying power to said electronic component means; and
power on/off switching means provided in said opening of said cover means for turning the power on and off.

15. An apparatus according to claim 14, wherein said electronic component means includes a plurality of semiconductor integrated circuit chips.

16. An apparatus according to claim 15, wherein said circuit board means includes a plurality of insulating sheet members, one of said insulating sheet members having a plurality of openings for accommodating said integrated circuit chips.

17. An apparatus according to claim 15, wherein each of said integrated circuit chips is accommodated in said opening of one insulating sheet member, while being supported by another of said insulating sheet members.

18. An apparatus according to claim 14, wherein said power source means complrises a thin sheet-like dry battery cell, and wherein said cover means includes a receiving portion for receiving said battery cell on a reverse side of said display means.

19. An apparatus according to claim 18, further comprising a battery holder which is removably slideable into and out of a receiving portion of the card-like electronic apparatus, and wherein said battery cell is removably received in said battery holder.

20. An apparatus according to claim 19, wherein:
said battery holder includes a terminal plate which is in contact with at least one of the electrodes of said battery cell; and
said electronic component means incoudes a conductive metal plate which is in contact with said terminal plate and which is also connected to said wiring pattern of said circuit board means.

21. An apparatus according to claim 20, wherein said conductive metal plate includes means for engaging with said battery holder while in contact with said terminal plate.

* * * * *